US008943145B1

(12) United States Patent
Peters et al.

(10) Patent No.: US 8,943,145 B1
(45) Date of Patent: Jan. 27, 2015

(54) CUSTOMER SUPPORT VIA SOCIAL NETWORK

(75) Inventors: Vidya Peters, San Francisco, CA (US); Aditya Singh, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 936 days.

(21) Appl. No.: 12/702,215

(22) Filed: Feb. 8, 2010

(51) Int. Cl.
*G06F 15/16* (2006.01)

(52) U.S. Cl.
USPC ............ 709/206; 709/217; 709/218; 709/229

(58) Field of Classification Search
CPC ......... H04L 51/32; H04L 67/22; H04L 67/30; H04L 67/303; H04L 67/306
USPC .................................. 709/206, 217, 218, 229
See application file for complete search history.

(56) References Cited

U.S. PATENT DOCUMENTS

| | | | | |
|---|---|---|---|---|
| 6,785,834 | B2 * | 8/2004 | Chefalas et al. | 714/4.3 |
| 6,938,000 | B2 * | 8/2005 | Joseph et al. | 705/304 |
| 7,249,045 | B2 * | 7/2007 | Lauffer | 705/7.13 |
| 8,140,441 | B2 * | 3/2012 | Cases et al. | 705/304 |
| 8,484,083 | B2 * | 7/2013 | Basu et al. | 705/14.66 |
| 2005/0038686 | A1 * | 2/2005 | Lauffer | 705/8 |
| 2007/0203996 | A1 * | 8/2007 | Davitz et al. | 709/206 |
| 2008/0034060 | A1 * | 2/2008 | Fisher | 709/218 |
| 2009/0138317 | A1 * | 5/2009 | Schoenberg | 705/9 |
| 2009/0245500 | A1 * | 10/2009 | Wampler | 379/265.09 |
| 2009/0282002 | A1 * | 11/2009 | Reeder et al. | 707/3 |
| 2010/0049702 | A1 * | 2/2010 | Martinez et al. | 707/4 |
| 2010/0100412 | A1 * | 4/2010 | Cases et al. | 705/9 |
| 2010/0114887 | A1 * | 5/2010 | Conway et al. | 707/737 |
| 2010/0121889 | A1 * | 5/2010 | Arumainayagam et al. | 707/803 |
| 2011/0022621 | A1 * | 1/2011 | Luo et al. | 707/769 |
| 2011/0041082 | A1 * | 2/2011 | Nguyen | 715/752 |
| 2011/0137989 | A1 * | 6/2011 | Kiciman et al. | 709/204 |
| 2011/0141919 | A1 * | 6/2011 | Singh et al. | 370/252 |
| 2011/0145192 | A1 * | 6/2011 | Quintela et al. | 707/623 |
| 2011/0191371 | A1 * | 8/2011 | Elliott | 707/770 |
| 2011/0213800 | A1 * | 9/2011 | Saros et al. | 707/769 |
| 2012/0005221 | A1 * | 1/2012 | Ickman et al. | 707/769 |
| 2012/0253934 | A1 * | 10/2012 | Ahopelto | 705/14.55 |

* cited by examiner

*Primary Examiner* — Thanh Tammy Nguyen
*Assistant Examiner* — Jonathan Bui
(74) *Attorney, Agent, or Firm* — Osha Liang LLP

(57) ABSTRACT

A method to provide customer support including searching a social network server for a pre-determined customer support keyword in social network messages, to obtain information of a social network message sender where the pre-determined customer support keyword identifies a need of the sender for customer support, automatically sending a surrogate social network message to the sender including an offer to obtain customer support via a customer support link embedded in the surrogate social network message, and presenting customer support information to the sender in response to the sender activating the customer support link upon receiving the surrogate social network message and accepting the offer.

30 Claims, 6 Drawing Sheets

CUSTOMER SUPPORT VIA SOCIAL NETWORK

BACKGROUND

Customer support (or technical support) is a range of services providing assistance with products or services such as computers, software applications, or related services. In general, customer support services attempt to help the user solve specific problems encountered during the use of such computers or software applications. Customer support may be offered for free or for a fee, offered by a provider of the computer/software application or a third party fee-based service company, delivered over the telephone or via various online media such as e-mail, website, or chat window. Large organizations often provide internal customer support to staff for computer or software application related issues. The Internet is also a common source where users can obtain freely available technical support where experienced users may provide advice and assistance through forums, user communities or other website mechanisms.

A social network is a social structure (e.g., community) made of members (e.g., a person) connected by social relationships such as friendship, kinship, relationships of beliefs, knowledge, prestige, culture, etc. Members of a social network often share interests and activities relating to such social relationships. For example, individual computers linked electronically could form the basis of computer mediated social interaction and networking within a social network community. A social network service focuses on building online communities of people who share interests and/or activities, or who are interested in exploring the interests and activities of others. Most social network services are web based and provide a variety of ways (e.g., e-mail, instant messaging service, etc.) for users (or members) to interact socially. Examples of computer mediated social network services include Facebook® (a registered trademark of Facebook, Inc., Palo Alto, Calif.), Myspace® (a registered trademark of Myspace, Inc., Beverly Hills, Calif.), Twitter® (a registered trademark of Twitter, Inc., San Francisco, Calif.), LinkedIn® (a registered trademark of LinkedIN, Ltd., Mountain View, Calif.), etc.

SUMMARY

In general, in one aspect, the invention relates to a method to provide customer support. The method includes searching, using a processor of a computer system, a social network server of a social network for a pre-determined customer support keyword in a plurality of social network messages, obtaining information of a sender of a social network message of the plurality of the social network messages when the pre-determined customer support keyword is detected in the social network message, wherein the pre-determined customer support keyword identifies a need of the sender of the social network message for customer support, sending, using the processor automatically without human intervention, a first surrogate social network message from a surrogate social network account registered on the social network server to the sender of the social network message, wherein the first surrogate social network message comprises an offer to the sender of the social network message to obtain customer support via a customer support link embedded in the first surrogate social network message, and responsive to the sender of the social network message activating the customer support link upon receiving the first surrogate social network message and accepting the offer, presenting customer support information to the sender of the social network message.

In general, in one aspect, the invention relates to a system for providing customer support. The system includes a social network server of a social network, communicatively coupled to a customer support server and including a messaging controller configured to receive and post a plurality of social network messages from a plurality of members of the social network, an application programming interface (API) configured to provide programming access to data of the plurality of social network messages by third party software applications, and a surrogate social network account registered for the customer support server to send surrogate social network messages in the social network, and the customer support server including a social network agent configured to search the social network server for a pre-determined customer support keyword in the plurality of social network messages, obtain information of a sender of a social network message of the plurality of the social network messages when the pre-determined customer support keyword is detected in the social network message, wherein the pre-determined customer support keyword identifies a need of the sender of the social network message for customer support, wherein the sender of the social network message is one of the member of the social network, send, automatically without human intervention, a first surrogate social network message from the surrogate social network account to the sender of the social network message, wherein the first surrogate social network message comprises an offer to the sender of the social network message to obtain customer support via a customer support link embedded in the first surrogate social network message, and responsive to the sender of the social network message activating the customer support link upon receiving the first surrogate social network message and accepting the offer, present customer support information to the sender of the social network message.

In general, in one aspect, the invention relates to a computer readable medium, embodying instructions executable by a computer processor to perform method steps to provide customer support. The instructions include functionality for searching a social network server of a social network for a pre-determined customer support keyword in a plurality of social network messages, obtaining information of a sender of a social network message of the plurality of the social network messages when the pre-determined customer support keyword is detected in the social network message, wherein the pre-determined customer support keyword identifies a need of the sender of the social network message for customer support, sending, automatically without human intervention, a first surrogate social network message from a surrogate social network account registered on the social network server to the sender of the social network message, wherein the first surrogate social network message comprises an offer to the sender of the social network message to obtain customer support via a customer support link embedded in the first surrogate social network message, and responsive to the sender of the social network message activating the customer support link upon receiving the first surrogate social network message and accepting the offer, presenting customer support information to the sender of the social network message.

Other aspects of the invention will be apparent from the following description and the appended claims.

DETAILED DESCRIPTION

Figure 1:
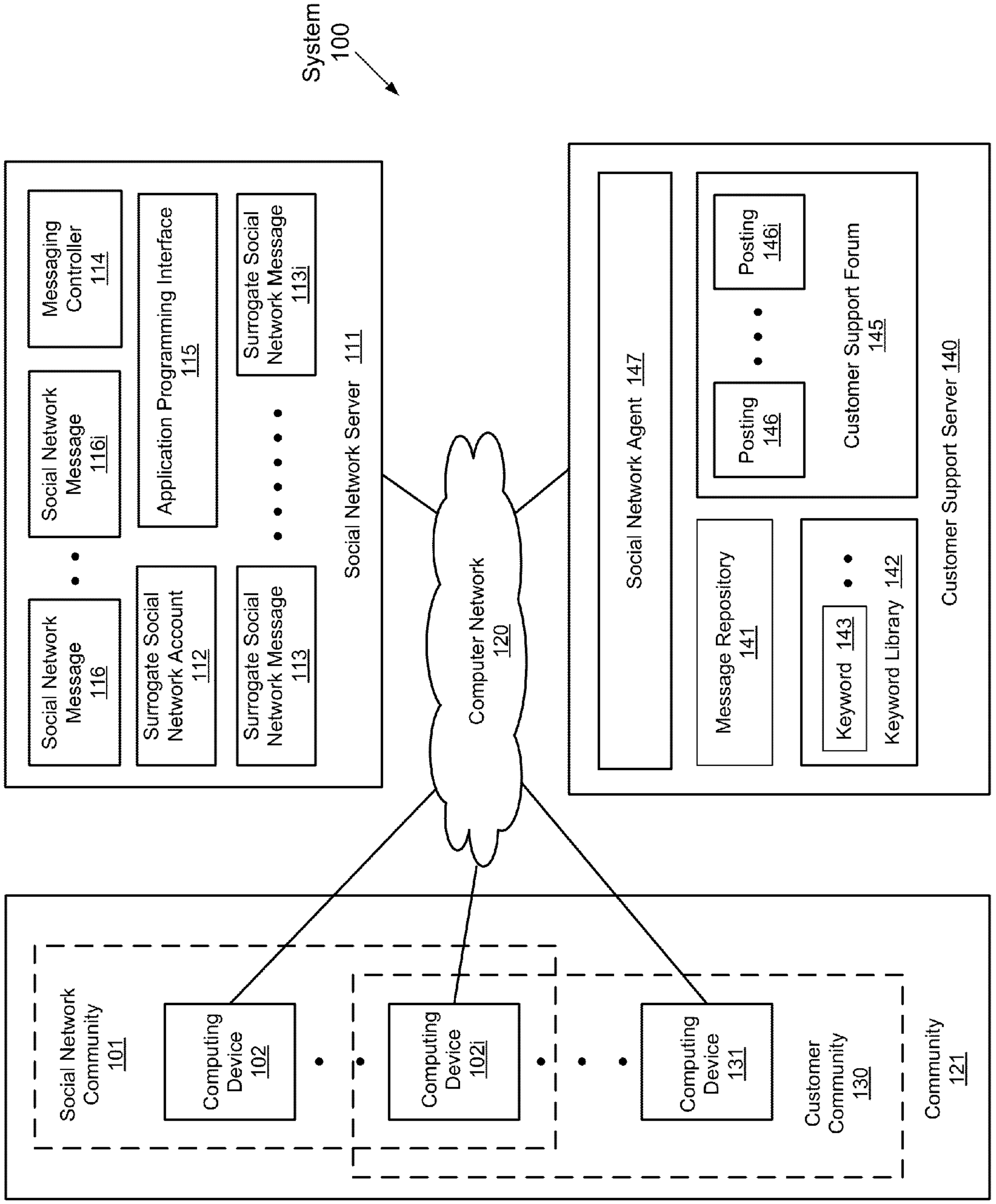
FIG. 1 depicts a schematic block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relates to a system and method to provide proactive customer support for a product or service by monitoring social network messages to detect keywords identifying a need of a user for customer support related to such product or service. In such embodiments, the system and method provide capabilities for a sender (i.e., the user) of such social network message needing customer support to be automatically directed to a customer support resource (e.g., customer support forum). In one or more embodiments, the user is invited via a surrogate social network message, sent automatically from a surrogate social network account registered for the customer support resource, to automatically access the customer support resource. In one or more embodiments, the keyword used in monitoring the social network messages is selected from a keyword library updated in real time based on on-going customer support activities of the customer support resource. Accordingly, the user receives effective customer support even if the user finds it inconvenient to use or is not familiar with traditional channels for customer support such as community forums, tech support phone numbers, web-based call back forms, etc.

FIG. 1 depicts a schematic block diagram of a system (100) in accordance with one or more embodiments of the invention. In one or more embodiments of the invention, one or more of the modules shown in FIG. 1 may be omitted, repeated, and/or substituted. Accordingly, embodiments of the invention should not be considered limited to the specific arrangements of modules shown in FIG. 1.

As shown in FIG. 1, the system (100) includes community (121), social network server (111), and customer support server (140), which are coupled via computer network (120). Further, the community (121) includes social network community (101) having computing devices (102, 102*i*, etc.) for accessing services provided by the social network server (111) and customer community (130) having computing devices (131, 102*i*, etc.) for accessing services provided by the customer support server (140). For example, the network (120) may be the Internet, the social network server (111) and the customer support server (140) may be part of the world wide web, and the computing devices (131, 102*i*, etc.) may include web browsers for presenting, traversing, and/or retrieving documents on the social network server (111) and the customer support server (140).

Further as shown in FIG. 1, the social network server (111) includes surrogate social network account (112), surrogate social network messages (113, 113*i*, etc.), messaging controller (114), application programming interface (API) (115), and social network messages (116, 116*i*, etc.). Furthermore, the customer support server (140) includes social network agent (147), message repository (141), keyword library (142) having keywords (143, etc.), and customer support forum (145) having postings (146, 146*i*, etc.).

The term "community" used in this document refers to any portion of an infrastructure including the computing devices (102, 102*i*, 131, etc.) and the associated group of users (not shown), facilities for accessing the computing devices and the group of users, representation of the computing devices and the group of users in data structures, and/or other relevant logistical information associated with the computing devices and the group of users. For example, the social network community (101) may refer to users of the computing devices (102, 102*i*, etc.) conducting computer mediated social interaction and networking via the social network server (111). In another example, the customer community (130) may refer to users of certain product or service (not shown) using the computing devices (131, 102*i*, etc.) to access the customer support server (140) for addressing customer support needs related to the product or service. In both examples, the computing devices (102, 102*i*, 131, etc.) of the community (121) are used by respective users to access shared community resources such as the social network server (111) or the customer support server (140).

Although three computing devices in the community (121) are shown in FIG. 1, those skilled in the art will recognize that any number of computing devices may be included in either the social network community (101) or the customer community (130). Further, although social network community (101) or the customer community (130) are shown to overlap and include one common computing device (102*i*), those skilled in the art will recognize that the social network community (101) and the customer community (130) may overlap and include any number of common computing devices (102*i*, etc.). Further still, although the computing devices (102, 102*i*, 131, etc.), the social network community (101), and the customer community (130) are shown to be coupled via a network (120), those skilled in the art will recognize that multiple networks, point-to-point connections, network gateways, or other suitable coupling configurations may also be used.

In one or more embodiments of the invention, each of the computing devices (102, 102*i*, 131, etc.) may be a computer, smart phone, gaming console, or other networked devices with computing capabilities. Generally speaking, users of the computing devices (102, 102*i*, etc.) are also users of the social network server (111) and members of the social network community (101) while users of the computing devices (131, 102*i*, etc.) are also users of the product or service and therefore users of the customer support server (140) and are also members of the customer community (130). The term "user" and "member" may be used interchangeably in this document to refer to a person or groups of persons using the computing devices, the social network and the social network server (111), or the product or service and the customer support server (140).

Although specific numbers of social network messages (116, 116*i*, etc.), surrogate social network messages (113, 113*i*, etc.), keywords (143, etc.), and postings (146, 146*i*, etc.)

are shown in FIG. 1 to illustrate the invention, those skilled in the art will recognize that, in one or more embodiments, any numbers of these elements may be included in the system (100).

In one or more embodiments of the invention, members of the social network server (111) (i.e., users of the computing devices (102, 102*i*, etc.)) register on the social network server (111) to create respective social network accounts (not shown) for posting social network messages (116, 116*i*, etc.). In one or more embodiments, the social network server (111) includes the messaging controller (114), which is configured to manage such respective social network accounts by receiving and posting such social network messages (116, 116*i*, etc.). In one or more embodiments, posting social network messages (116, 116*i*, etc.) includes posting a public social network message (116) on a publically accessible forum such as a message board (not shown) hosted on the social network server (111) and routing a private social network message (116*i*) to a recipient member of the social network community (101) such as a user of the computing device (102*i*). For example, a user of the computing device (102) may post the public social network message (116) describing a problem using a product or service related to the customer support server (140). However, the user of the computing device (102) may not be familiar with or find it inconvenient in using the customer support server (140) therefore does not report such problem using the customer support server (140). Nevertheless, the description in the social network message (116) may contain a customer support related keyword that may be used to identify a need of the sender of the public social network message (116) (i.e., the user of the computing device (102)) for customer support.

In one or more embodiments of the invention, the social network server (111) includes the API (115), which is configured to provide programming access to various data of the social network server (111). For example, third party software applications may access various data (e.g., parameter, status, etc.) of the social network messages (116, 116*i*, etc.) using the API (115). In one or more embodiments, the API (115) includes a search function. In one or more embodiments, a software agent (e.g., the social network agent (147)) running on the customer support server (140) uses the search function of the API (115) to obtain a social network message (e.g., 116) based on a pre-determined customer support keyword. Further to the example of the user of the computing device (102) posting the public social network message (116) describing a problem in using a product or service related to the customer support server (140), such public social network message (116) and an associated ID may be returned by the search function of the API (131) to the social network agent (147) if the pre-determined customer support keyword is found to be present in the public social network message (116). More details of searching customer support related social network messages (e.g., 116) are described in reference to FIGS. 2A, 2B, 3A, and 3B below.

In one or more embodiments, the API (115) includes a flag function. In one or more embodiments, the social network agent (147) uses the flag function to obtain status information (e.g., user name of the user of the computing device (102) or status of an embedded link) of the public social network message (116) based on the associated ID.

In one or more embodiments of the invention, the surrogate social network account (112) is registered on the social network server (111) to represent the customer support server (140) and allows the customer support server (140) to send "surrogate" social network messages (113, 113*i*, etc.), automatically without human intervention, as if the customer support server (140) is a live person participating in the social network community (101). In general, the surrogate social network messages (113, 113*i*, etc.) conform to the same format standard of "regular" social network messages (116, 116*i*, etc.) required by the social network server (111).

In one or more embodiments, the surrogate social network messages (e.g., 113, 113*i*, etc.) includes one or more embedded links (e.g., hyperlink, web link, etc.) to facilitate the recipients of the surrogate social network messages (e.g., 113, 113*i*, etc.) in accessing customer support information. For example, the surrogate social network messages (e.g., 113, 113*i*, etc.) may include an offer to obtain customer support by activating (i.e., clicking) the one or more embedded links. In one or more embodiments, the social network agent (147) uses the flag function to obtain status information regarding whether any of the embedded links is activated (i.e., clicked) by a recipient of the surrogate social network messages (e.g., 113, 113*i*, etc.). More details of using embedded links in the surrogated social network messages (e.g., 113, 113*i*, etc.) and the flag function of the API (115) to facilitate communication between members of the social network community (101) and the customer support server (140) for presenting customer support information are described in reference to FIGS. 2A, 2B, 3A, and 3B below.

In one or more embodiments of the invention, the customer support server (140) includes the customer support forum (145), which is configured to provide access to customer support postings. For example, the customer support postings may be posted as frequently asked questions (FAQs), posted as discussion threads by members of the customer support community (130) regarding problems in using the product or service, posted by customer support staff into the discussion threads as potential answers or solutions to the problems, and/or other types of customer support information. In one or more embodiments, the customer support information in these postings is accessible using a browser of any of the computing devices (102*i*, 131, etc.) in the customer support community (130).

In one or more embodiments of the invention, the customer support server (140) includes the keyword library (142), which is configured to store customer support related keywords (143, etc.). For example, the customer support related keyword (143) may relate to a feature, function, error message, or other customer support issues of the product or service. Generally speaking, such customer support keywords (143, etc.) may appear in the postings of the customer support forum (145) at an on-going basis. In one or more embodiments, the keyword library (142) is updated in real-time based on the on-going posting activities to capture newly occurred customer support issues in an expedient manner. In one or more embodiments, the social network agent (147) searches social network messages (116, 116*i*, etc.) using each keyword (143, etc.) in the keyword library (142). As a result, the social network agent (147) may capture an outbreak of user complaints among members of the social network community (101), for example when a new version of the product or service is released.

In one or more embodiments of the invention, the customer support server (140) includes the message repository (141), which is configured to store one or more social network messages (e.g., 116, 116*i*, etc.) obtained by the social network agent (147) for analysis. For example, a customer support staff may browse the message repository (141) to identify particular customer support issues that may require attention in, for example preparing a corresponding FAQ posting.

Figure 2A:
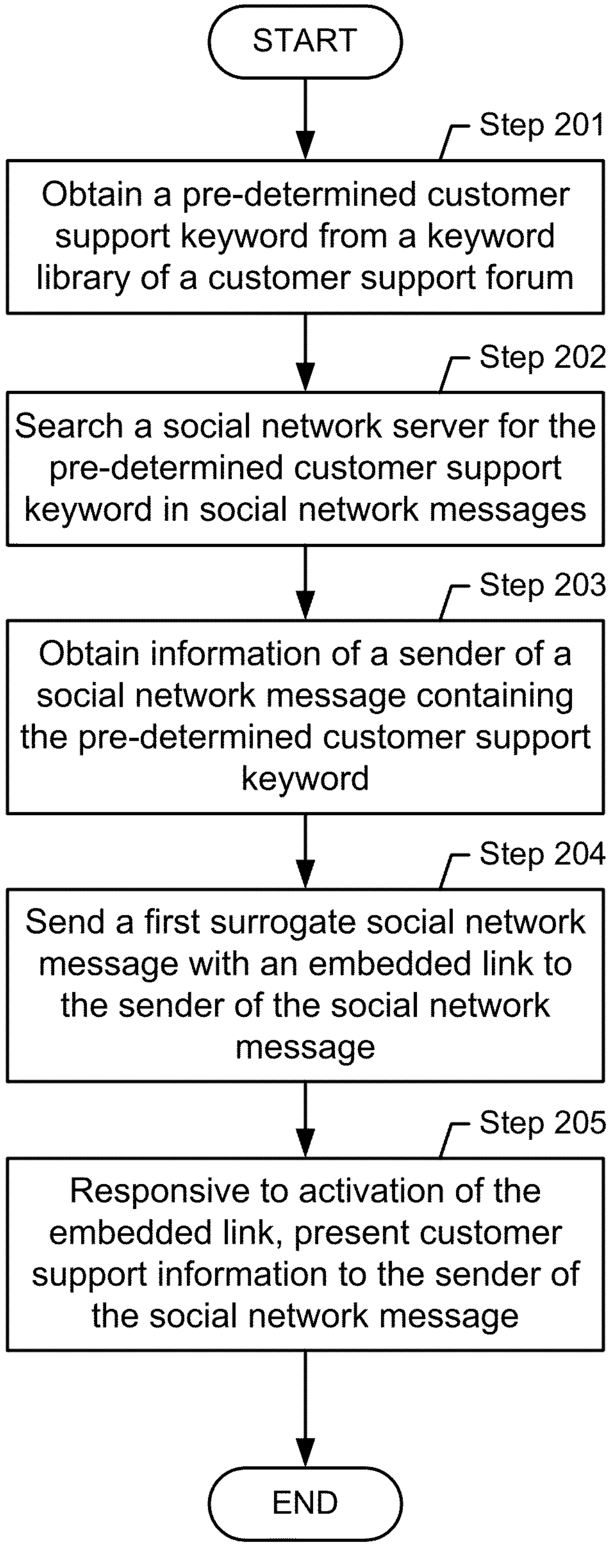
FIGS. 2A and 2B depict flowcharts of a method in accordance with one or more embodiments of the invention.
Figure 2B:
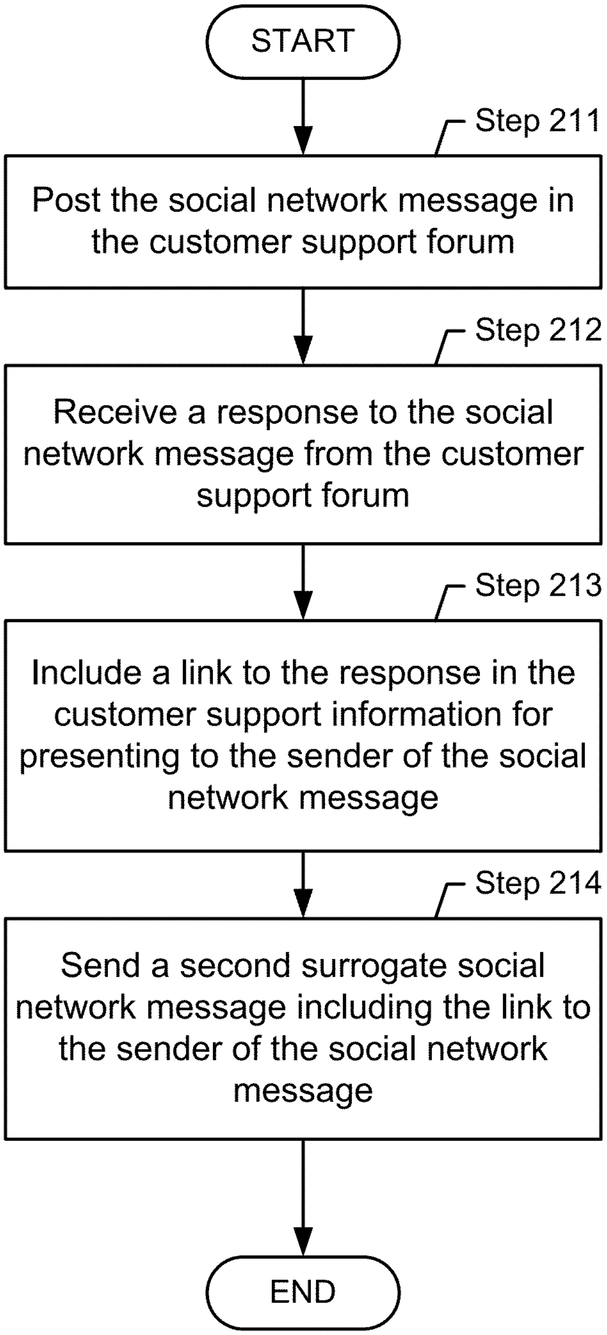

FIGS. 2A and 2B depicts flowcharts of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B.

The method depicted in FIGS. 2A and 2B may be practiced using system (100) described with respect to FIG. 1 above. Initially in Step 201 of FIG. 2A, a pre-determined customer support keyword is obtained from a keyword library of a customer support forum. In one or more embodiments of the invention, the keyword library is included in a customer support server hosting the customer support forum that includes postings related to customer support of a product or service.

As described with regard to FIG. 1 above, the customer support postings may include on-going user discussions regarding problems encountered in using the product or service as well as potential answers or solutions provided by customer support staff addressing the problems. In one or more embodiments, the keyword is defined (i.e., pre-determined) based on these postings to represent the problems encountered by the users while the keyword library is updated by adding new keywords in real-time based on the new postings added to the customer support forum at an on-going basis.

For example, user problems may arise due to a new version of the product or service being released. As a result, postings reporting such user problems may appear rampantly in the customer support forum. Accordingly, new keywords may be defined and added to the keyword library relating to such newly reported user problems. For example, the new keyword may be related to a new feature offered in the new version of the product or service or a new error message produced by the new version of the product or service.

In one or more embodiments, each keyword in the keyword library is obtained in a pre-determined manner for use in the method Steps 202 and 203 to identify members in a social network community that may need customer support relating to problems represented by the keyword. For example, the keywords may be obtained based on a chronological order of when each keyword is added to the keyword library, based on a category grouping related to particular types of user problem represented by each keyword, based on alphabetical order of the keywords, or based on other suitable sequences configured in the keyword library.

In Step 202, a social network server is searched for social network messages containing the pre-determined customer support keyword. For example, users of the new version of the product or service needing customer support may be unfamiliar with the customer support forum or finding using the customer support forum inconvenient. As a result, some of such users who are also members in the social network community may post social network messages referring to (e.g., complaining about) problems encountered in using the new version of the product or service. Because similar problems may have been reported by other users in the customer support forum, new keyword added as a result may be used to search the social network server and identify these social network community members needing customer support. In one or more embodiments, the search is performed using a search function of an application programming interface (API) provided by the social network server. In one or more embodiments, the search function returns a social network message containing the pre-determined customer support keyword obtained in Step 201 with an associated ID.

In one or more embodiments of the invention, the API includes a flag function for returning various status information of the social network message. In Step 203, the information (e.g., user name) of a sender of the social network message containing the pre-determined customer support keyword is obtained using the flag function of the API based on the ID associated with the social network message. In particular, the sender is among the social network community members needing customer support as identified in the Step 202 above.

In Step 204, a first surrogate social network message is sent to the sender of the social network message containing the pre-determined customer support keyword. Specifically, this sender, who is among the social network community members needing customer support, is a recipient of the first surrogate social network message. In the following discussion in reference to FIGS. 2A and 2B, the terms "sender", "sender of the social network message", "sender of the social network message containing the pre-determined customer support keyword", and "recipient of the first surrogate social network message" may be used interchangeably to refer to the same person depending on the context. In one or more embodiments of the invention, "surrogate" social network messages are of the same format as "regular" social network messages with the exception that the surrogate social network messages are sent, automatically without human intervention, from a "surrogate" social network account registered on the social network server to represent the customer support server instead of sent from a "regular" social network account of a live person member of the social network community.

In one or more embodiments of the invention, the first surrogate social network message includes an offer to the recipient to obtain customer support via a customer support link (e.g., hyperlink, web link, etc.) embedded in the first surrogate social network message. In one or more embodiments, the first surrogate social network message containing the embedded link is sent using the API of the social network server. Upon receiving such offer, the recipient, i.e., the sender of the social network message containing the pre-determined customer support keyword thus indentified as one needing customer support, may choose to ignore the first surrogate social network message thus effectively decline the offer or to activate the embedded link to accept the offer.

In Step 205, responsive to the recipient of the first surrogate social network message activating the embedded customer support link and accepting the offer, customer support information is presented to the recipient, i.e., the sender of the social network message containing the pre-determined customer support keyword thus indentified as one needing customer support.

In one or more embodiments of the invention, the sender of the social network message sends the social network message and receives the first surrogate social network message using a computing device such as a mobile phone, notebook computer, desktop computer, etc. In one or more embodiments, customer support information is presented by redirecting a browser of the computing device based on the activated link to view the customer support forum for accessing the customer support information. For example, the customer support forum may be accessible via the world wide web and the browser is a web browser for traversing and retrieving information resources on the world wide web. The world wide web and the web browser are known to those skilled in the art. Because similar problems may have been reported by other users in the customer support forum, the browser may be used to traverse discussion threads relating to such problems with potential answers or solutions.

In one or more embodiments of the invention, presenting the customer support information in Step 205 includes posting the social network message containing the pre-determined customer support keyword in the customer support forum to solicit potential answers or solutions. FIG. 2B depicts a flow chart of detail steps within the Step 205 in such embodiments.

In one or more embodiments depicted in FIG. 2B, the offer as described in Step 204 of FIG. 2A to the sender of the social network message to obtain customer support is formatted as an offer to post the social network message in the customer support forum as one of many customer support postings. Upon receiving such offer, the recipient, i.e., the sender of the social network message containing the pre-determined customer support keyword thus indentified as one needing customer support, may choose to ignore the first surrogate social network message thus effectively decline the offer or to activate the embedded link to accept the offer.

In Step 211, responsive to the recipient activating the embedded customer support link and accepting the offer, the social network message containing the pre-determined customer support keyword is posted in the customer support forum. In one or more embodiments, the status of the embedded link being activated indicating the acceptance of the offer is obtained from the API of the social network server, for example using a flag function of the API. In one or more embodiments, the browser of the computing device of the recipient is redirected based on the activated link to view the customer support forum for confirming the posting of the social network message.

In Step 212, a response to the posted social network message containing the pre-determined customer support keyword is received from the customer support forum. For example, the response may be another posting in the customer support forum posted by a member of the customer support community or a customer support staff browsing the customer support forum.

In Step 213, a link (e.g., hyperlink, web link, etc.) to the response is included in the customer support information, as described in Step 205 of FIG. 2A, for presenting to the sender of the social network message. For example, the response posting may be contained in a web page of the customer support forum accessible via the web link.

In Step 214, a second surrogate social network message including the link to the response is sent to the sender of the social network message. In one or more embodiments of the invention, the second surrogate social network message is sent from the surrogate social network account representing the customer support server using the API of the social network server. Upon receiving second surrogate social network message, the recipient, i.e., the sender of the social network message containing the pre-determined customer support keyword thus indentified as one needing customer support, may choose to ignore the second surrogate social network message or to activate the embedded link to view the response to the posted social network message in the customer support forum.

Figure 3A:
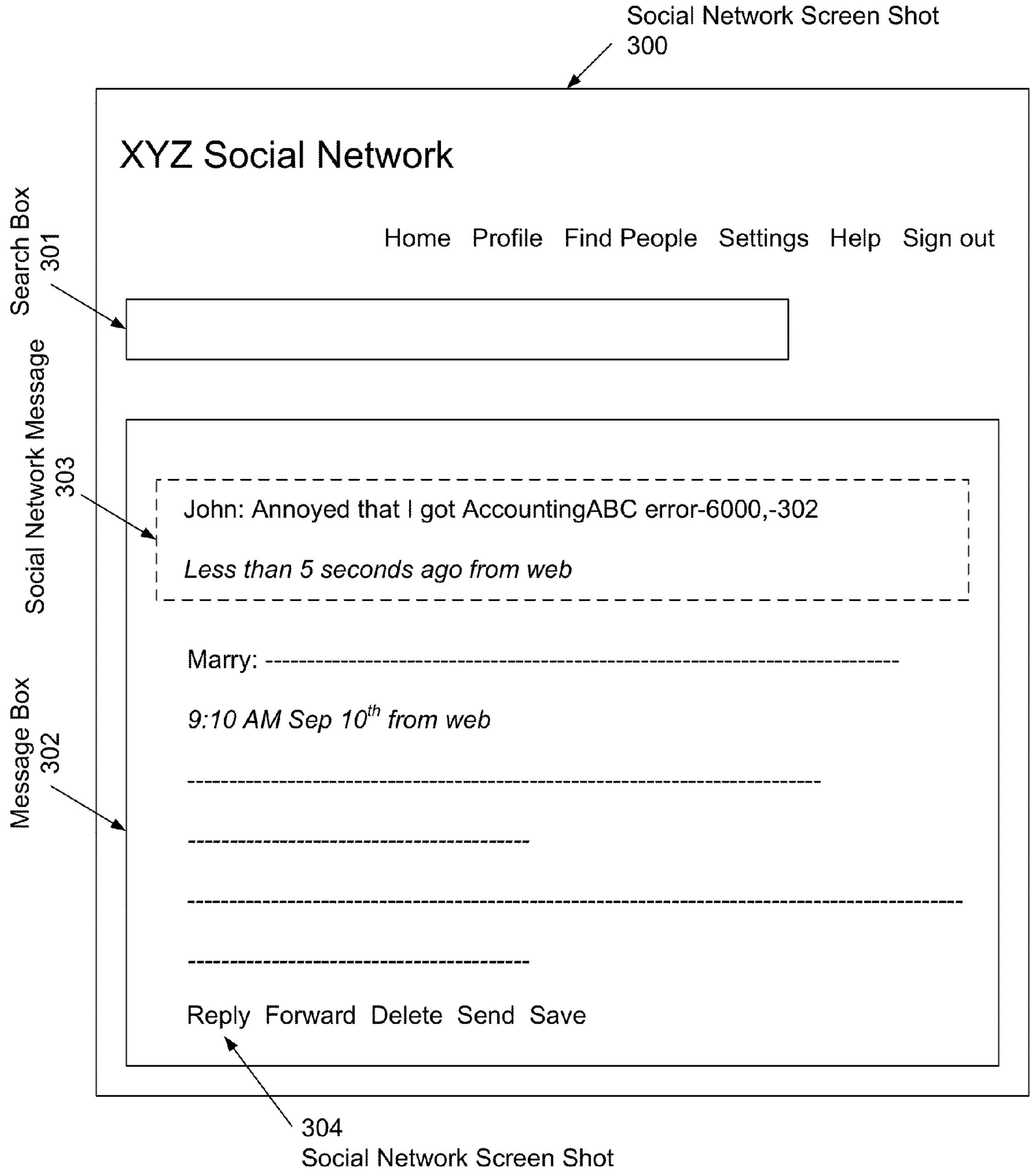
FIGS. 3A and 3B depict screen shots of an application example in accordance with one or more embodiments of the invention.
Figure 3B:
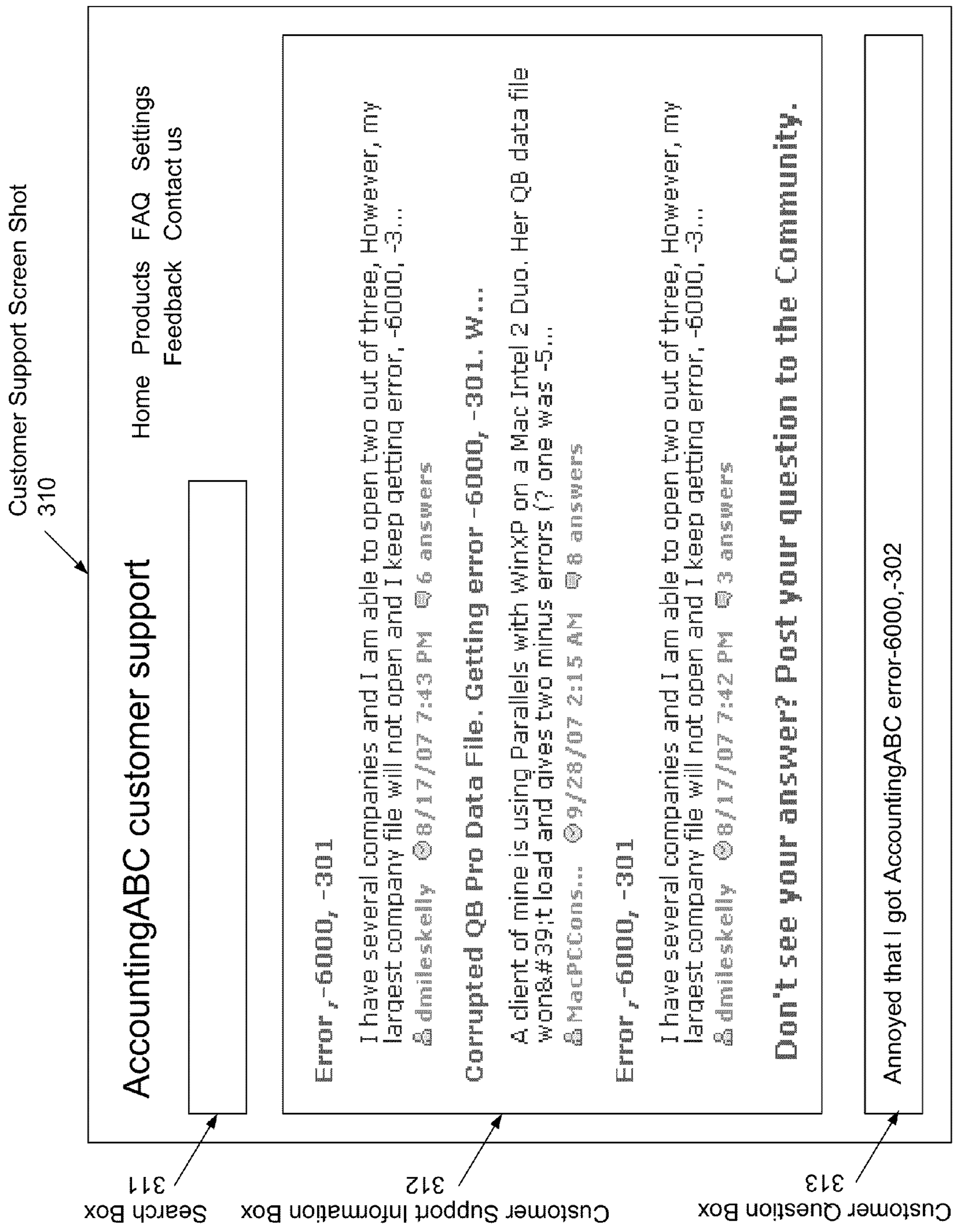

FIGS. 3A and 3B depict screen shots of an application example in accordance with one or more embodiments of the invention. This exemplary application may be practiced using the system (100) of FIG. 1 and based on the method described with respect to FIGS. 2A and 2B above. The example depicted in FIGS. 3A and 3B may be a professional "John" who is a user of accounting software "AccountingABC" encountering a problem in using Accoountingabc and sends a message to his online social network community complaining about his problem. In this example, the social network may be XYZ social network (e.g., Twitter®, in which case the social network message may be a Tweet® (a registered trademark of Twitter, Inc., San Francisco, Calif.)), and the computing device coupled to the network may be a mobile phone connected to the Internet via a data network of the mobile phone service provider.

In an example scenario, customer support is a huge pain point for both AccountingABC users (e.g., John) as well as AccountingABC, Inc. that distributes and supports the accounting software "AccountingABC". Customer support has been one of biggest operating expenses for AccountingABC, Inc. In the past, AccountingABC, Inc. has had very traditional channels for customer support such as community forums, technical support phone numbers, web-based call back forms, etc. However, many of the AccountingABC users (e.g., John) are either not familiar with these support channels or find it inconvenient and time-consuming.

More recently, several of the AccountingABC users are actively using XYZ social network (e.g., Twitter®) to voice their concerns and complaints regarding problems they encounter in using AccounitngABC. For example, FIG. 3A shows a screen shot (300) of the XYZ social network, which may be viewed using an Internet connected computing device such as John's mobile phone or other computing devices of John's fellow members of XYZ social network.

As shown in FIG. 3A, the screen shot (300) includes a search box (301) and a message box (302) displaying a number of social network messages (e.g., 303). Generally speaking, the search box (301) allows a user (or member) of the XYZ social network to search for messages particular to his/her interest while the message box allows the user to view or type in social network messages. In particular, the social network message (303) is posted by John to complain about an error code "error-6000,-301" he encountered when using AccountingABC. The social network message (303) is visible to any members registered with XYZ social network and having an active XYZ social network account. By logging into the XYZ social network account and viewing the social network message (303), the member may type in and send a reply message back to John using a reply function (304) of the XYZ social network.

Considering the social network phenomenon as an opportunity to provide proactive customer support, AccountingABC Inc. has created a new section on the customer support website to address the social network messages relating to AccountingABC customer support issues. The customer support website is hosted on an AccountingABC customer support server (not shown).

FIG. 3B shows a screen shot (310) of the customer support website including the search box (311), the customer support information box (312), and the customer question box (313). Generally speaking, the search box (311) allows a user of AccountingABC to search for customer support information to be displayed in the customer support information box (312). For example, the customer support information box (312) may be used to display Frequently Asked Questions (FAQs) and corresponding answers, chat room discussions among users and/or between users and customer support staff of AccountingABC Inc., or other types of customer support forums.

As shown in FIG. 3B, the customer support information box (312) displays chat room discussion threads. In particular, two discussion threads dated 7:42 PM and 7:43 PM of Aug. 17, 2007 are originated by the same user "dmileskelly" discussing error 301 of the error 6000 category. Another discussion thread is dated 2:15 AM by another user "MacPPCons . . . " discussing corrupted QB Pro Data File resulting in error 301 of the error 6000 category.

Recognizing the error 6000 category has attracted many user attentions, the keyword "Error,-6000" is added to a keyword library to detect related social network messages within the XYZ social network community shortly after a surge of postings involving the error 6000 category in various AccountingABC customer support forums. Similar and/or related versions of the keyword "Error,-6000" may also be added, such as "error,-6000", "error 6000", etc. Using methods/functions provided in an application programming interface (API) available to third party developers (e.g., AccountingABC Inc.) of XYZ social network, any XYZ social network message embedded with the "Error,-600" or similar/related keyword is extracted by the AccounitngABC customer support server. For example, all such social network messages may be complied and displayed at a specific customer support website domain (e.g., support.AccountingABC.com/XYZ_Social_Network) (not shown) so that either AccountingABC customer support staff or fellow AccouningABC users browsing the customer support website can answer or respond by, for example forming an additional discussion thread that can be displayed in the customer support information box (312).

In the example depicted in FIG. 3B, a surrogate account has been set up on the XYZ social network server to represent AccountingABC customer support website (or server) in the XYZ social network community. Upon extracting the social network message (302) posted by John using the XYZ social network server API, the AccountingABC customer support server sends a surrogate social network message to invite John to access customer support information on the AccountingABC customer support website. For example, when the social network is Twitter®, the surrogate social network message Tweet® is limited in length (e.g., 140 characters) and may be in the form of "AcctABC support (i) Search online self-help http://bit.ly/33rw3A (ii) Post your problem to the community 4 help http://bit.ly/5yvOI". In this example message, "AcctABC" represents "AccountingABC" and "4" represents "for", which are common types of abbreviation used in online communications.

If John chooses option one when viewing this surrogate social network message on his mobile phone and click on the online self-help link "http://bit.ly/33rw3A", the browser on his mobile phone will be redirected to the AccountingABC customer support website. For example, the screen shot (310) may be displayed on John's mobile phone for him to search various support information using the search box (311) and the customer support information box (312).

If John chooses option two when viewing the surrogate social network message on his mobile phone and click on the message posting link "http://bit.ly/5yvOI", the AccountingABC customer support server will receive an indication as such via a "FLAG" function of the Twitter® API. Responsive to receiving this indication, the AccountingABC customer support server automatically posts the extracted message (304) on behalf of John in the customer question box (313) as depicted in FIG. 3B. In addition, the browser on John's mobile phone will be redirected to the AccountingABC customer support website, for example to confirm the posting and to browse available customer support information in the customer support information box (312). For example, the screen shot (310) may be displayed on John's mobile phone.

When somebody posts a response to the posted message in the customer question box (313), the AccounitngABC customer support server sends another surrogate social network message to John informing him that a response is posted. For example, a script may be triggered for copying & pasting the response to the surrogate tweets in the form of "Response to your question is available at AcctABC support online self-help http://bit.ly/33rw3A". Accordingly, John may click on the online self-help link to view the response in the customer support information box (312), which will have a discussion thread (not shown) relating to the "Error,-6000,-302" topic.

Figure 4:
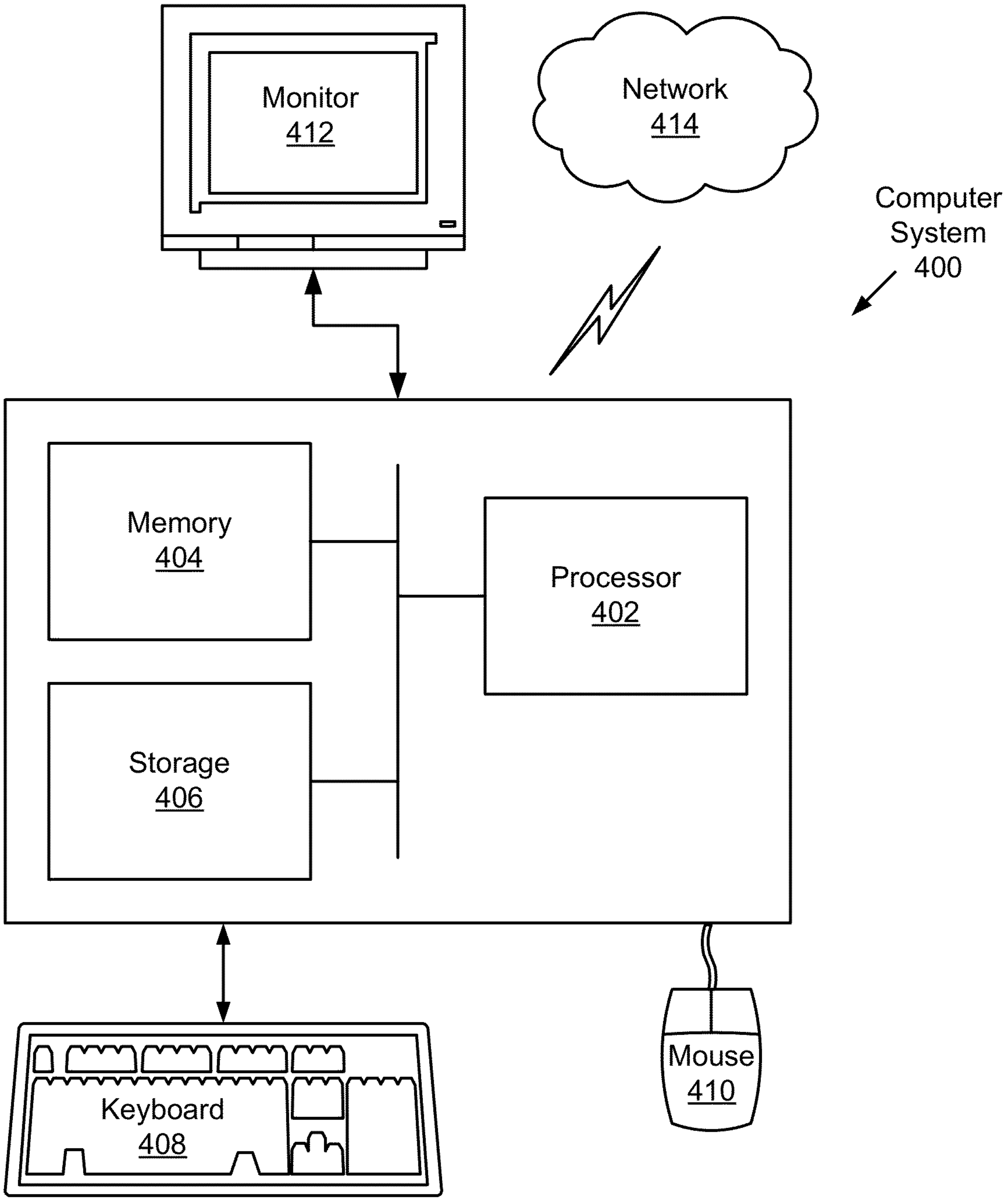
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402) (such as a hardware central processing unit (CPU) or other hardware processing device), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., computing device, mentor, authentication module, attendance module, query engine, data repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to provide customer support, comprising:

searching, by a processor of a customer support computer system, a social network server of a social network for a pre-determined customer support keyword in a plurality of social network messages, wherein the pre-determined customer support keyword is found while the plurality of social network messages are exchanged among customers via social network accounts maintained on the social network server for the customers, wherein the customer support computer system is separate from the social network server;

obtaining information of a sender of a social network message of the plurality of the social network messages when the pre-determined customer support keyword is detected in the social network message, wherein the pre-determined customer support keyword identifies a need of the sender of the social network message for customer support;

sending, using the processor automatically without human intervention, a first surrogate social network message from a surrogate social network account to the sender of the social network message, wherein the surrogate social network account is registered on the social network server to represent the customer support computer system as a user of the social network, wherein the first surrogate social network message comprises an offer to the sender of the social network message to obtain customer support via a customer support link embedded in the first surrogate social network message; and responsive to the sender of the social network message activating the customer support link upon receiving the first surrogate social network message and accepting the offer, presenting customer support information to the sender of the social network message.

2. The method of claim 1, further comprising:

obtaining the pre-determined customer support keyword from a keyword library of a customer support server hosting a customer support forum, wherein the customer support forum comprises a plurality of postings related to customer support, wherein the keyword library is updated in real time and identified based on the plurality of postings.

3. The method of claim 2, wherein the sender of the social network message sends the social network message and receives the first surrogate social network message using a computing device, the method further comprising:

responsive to the sender of the social network message activating the customer support link upon receiving the first surrogate social network message and accepting the offer, redirecting a browser of the computing device to view the customer support forum for accessing the customer support information.

4. The method of claim 2, wherein the offer to the sender of the social network message to obtain customer support further comprises an offer to post the social network message in the customer support forum as one of the plurality of postings, the method further comprising:

responsive to the sender of the social network message activating the customer support link upon receiving the first surrogate social network message and accepting the offer to post the social network message, posting the social network message in the customer support forum;

receiving a response to the social network message from the customer support forum; and including a link to the response in the customer support information for presenting to the sender of the social network message.

5. The method of claim 4, wherein presenting the customer support information to the sender of the social network message comprises sending a second surrogate social network message comprising the link to the response to the sender of the social network message.

6. The method of claim 4, wherein the sender of the social network message sends the social network message and receives the first surrogate social network message using a computing device, the method further comprising:

responsive to the sender of the social network message activating the customer support link upon receiving the first surrogate social network message and accepting the offer to post the social network message, redirecting a browser of the computing device to view the customer support forum for confirming the posting of the social network message.

7. The method of claim 1, wherein searching the social network server for the pre-determined customer support keyword in the plurality of social network messages is via an application programming interface of the social network server.

8. The method of claim 1, wherein sending the first surrogate social network message from the surrogate social network account registered on the social network server is via an application programming interface of the social network server.

9. The method of claim 1, wherein obtaining information of the sender of the social network message of the plurality of social network messages is via an application programming interface of the social network server.

10. The method of claim 1, further comprising:

receiving an acceptance to the offer from the sender of the social network message via an application programming interface of the social network server.

11. A system for providing customer support, comprising:

a social network server of a social network, communicatively coupled to a customer support server that is separate from the social network server, comprising:

a messaging controller configured to receive and post a plurality of social network messages from a plurality of members of the social network;

an application programming interface (API) configured to provide programming access to data of the plurality of social network messages by third party software applications; and a surrogate social network account registered on the social network server to represent the customer support server as a user of the social network; and the customer support server comprising a hardware processor and memory storing instructions executable by the hardware processor configured to perform:

searching the social network server for a pre-determined customer support keyword in the plurality of social network messages, wherein the pre-determined customer support keyword is found while the plurality of social network messages are exchanged among customers via social network accounts maintained on the social network server for the customers;

obtaining information of a sender of a social network message of the plurality of the social network messages when the pre-determined customer support keyword is detected in the social network message, wherein the pre-determined customer support keyword identifies a need of the sender of the social network message for customer support, wherein the sender of the social network message is one of the member of the social network;

sending, automatically without human intervention, a first surrogate social network message from the surrogate social network account to the sender of the social network message, wherein the first surrogate social network message comprises an offer to the sender of the social network message to obtain customer support via a customer support link embedded in the first surrogate social network message; and responsive to the sender of the social network message activating the customer support link upon receiving the first surrogate social network message and accepting the offer, presenting customer support information to the sender of the social network message.

12. The system of claim 11, the customer support server further comprising:

a customer support forum comprising a plurality of postings related to customer support; and a keyword library storing a plurality of keywords updated in real time based on the plurality of postings, wherein the social network agent is further configured to obtain the pre-determined customer support keyword from the keyword library for searching the social network server.

13. The system of claim 12, further comprising:

a computing device of the sender of the social network message for sending the social network message and receiving the first surrogate social network message, wherein the customer support link is configured to redirect a browser of the computing device to view the customer support forum responsive to the sender of the social network message activating the customer support link upon receiving the first surrogate social network message and accepting the offer.

14. The system of claim 12, wherein the offer to the sender of the social network message to obtain customer support further comprises an offer to post the social network message in the customer support forum as one of the plurality of postings, wherein the social network agent is further configured to:

post the social network message in the customer support forum responsive to the sender of the social network message activating the customer support link upon receiving the first surrogate social network message and accepting the offer to post the social network message;

search the customer support forum for a response to the social network message; and include a link to the response in the customer support information for presenting to the sender of the social network message.

15. The system of claim 14, wherein presenting the customer support information to the sender of the social network message comprises sending a second surrogate social network message comprising the link to the response to the sender of the social network message.

16. The system of claim 14, further comprising:

a computing device of the sender of the social network message for sending the social network message and receiving the first surrogate social network message, wherein the customer support link is configured to redirect a browser of the computing device to view the customer support forum for confirming the posting of the social network message responsive to the sender of the social network message activating the customer support link upon receiving the first surrogate social network message and accepting the offer to post the social network message.

17. The system of claim 11, wherein searching the social network server for the pre-determined customer support keyword in the plurality of social network messages is via a search function of the API.

18. The system of claim 11, wherein sending the first surrogate social network message from the surrogate social network account registered on the social network server is via the API.

19. The system of claim 11, wherein obtaining information of the sender of the social network message of the plurality of social network messages is via a search function of the API.

20. The system of claim 11, the social network agent is further configured to:

receive an acceptance to the offer from the sender of the social network message via a flag function of the API.

21. A non-transitory computer readable medium, embodying instructions executable by a computer processor to provide customer support, the instructions comprising functionality for:

searching a social network server of a social network for a pre-determined customer support keyword in a plurality of social network messages, wherein the pre-determined customer support keyword is found while the plurality of social network messages are exchanged among customers via social network accounts maintained on the social network server for the customers, wherein the customer support computer system is separate from the social network server;

obtaining information of a sender of a social network message of the plurality of the social network messages when the pre-determined customer support keyword is detected in the social network message, wherein the pre-determined customer support keyword identifies a need of the sender of the social network message for customer support;

sending, automatically without human intervention, a first surrogate social network message from a surrogate social network account to the sender of the social network message, wherein the surrogate social network account is registered on the social network server to represent the customer support computer system as a user of the social network, wherein the first surrogate social network message comprises an offer to the sender of the social network message to obtain customer support via a customer support link embedded in the first surrogate social network message; and responsive to the sender of the social network message activating the customer support link upon receiving the first surrogate social network message and accepting the offer, presenting customer support information to the sender of the social network message.

22. The non-transitory computer readable medium of claim 21, the instructions further comprising functionality for:

obtaining the pre-determined customer support keyword from a keyword library of a customer support server hosting a customer support forum, wherein the customer support forum comprises a plurality of postings related to customer support, wherein the keyword library is updated in real time and identified based on the plurality of postings.

23. The non-transitory computer readable medium of claim 22, wherein the sender of the social network message sends the social network message and receives the first surrogate social network message using a computing device, the instructions further comprising functionality for:

responsive to the sender of the social network message activating the customer support link upon receiving the first surrogate social network message and accepting the offer, redirecting a browser of the computing device to view the customer support forum for accessing the customer support information.

24. The non-transitory computer readable medium of claim 22, wherein the offer to the sender of the social network message to obtain customer support further comprises an offer to post the social network message in the customer support forum as one of the plurality of postings, the instructions further comprising functionality for:

responsive to the sender of the social network message activating the customer support link upon receiving the first surrogate social network message and accepting the offer to post the social network message, posting the social network message in the customer support forum;

receiving a response to the social network message from the customer support forum; and including a link to the response in the customer support information for presenting to the sender of the social network message.

25. The non-transitory computer readable medium of claim 24, wherein presenting the customer support information to the sender of the social network message comprises sending a second surrogate social network message comprising the link to the response to the sender of the social network message.

26. The non-transitory computer readable medium of claim 24, wherein the sender of the social network message sends the social network message and receives the first surrogate social network message using a computing device, the instructions further comprising functionality for:

responsive to the sender of the social network message activating the customer support link upon receiving the first surrogate social network message and accepting the offer to post the social network message, redirecting a browser of the computing device to view the customer support forum for confirming the posting of the social network message.

27. The non-transitory computer readable medium of claim 21, wherein searching the social network server for the predetermined customer support keyword in the plurality of social network messages is via an application programming interface of the social network server.

28. The non-transitory computer readable medium of claim 21, wherein sending the first surrogate social network message from the surrogate social network account registered on the social network server is via an application programming interface of the social network server.

29. The non-transitory computer readable medium of claim 21, wherein obtaining information of the sender of the social network message of the plurality of social network messages is via an application programming interface of the social network server.

30. The non-transitory computer readable medium of claim 21, the instructions further comprising functionality for:

receiving an acceptance to the offer from the sender of the social network message via an application programming interface of the social network server.

* * * * *